United States Patent Office.

DAVID FORBES, OF YORK PLACE, PORTMAN SQUARE, AND ASTLEY PASTON PRICE, OF LINCOLN'S-INN-FIELDS, ENGLAND.

Letters Patent No. 113,416, dated April 4, 1871.

IMPROVEMENT IN THE TREATMENT OF SEWAGE AND THE MANUFACTURE OF FERTILIZERS.

The Schedule referred to in these Letters Patent and making part of the same.

We, DAVID FORBES, consulting engineer, of York Place, Portman Square, and ASTLEY PASTON PRICE, consulting chemist, of 47 Lincoln's-Inn-Fields, both in the county of Middlesex and Kingdom of England, have invented Improvements in the Treatment of Sewage and in the production of compounds capable of being employed as manures, of which the following is a specification.

Our said invention relates—

First, to the preparation and treatment of natural products, consisting essentially of phosphates of alumina, such, for example, as occur in the West Indian islands; or of other natural phosphates, such as the phosphates containing phosphate of iron or phosphate of lime, or mixtures of the same; or of phosphate of iron or phosphate of lime and phosphate of alumina, or mixtures of the same, so as to render the same useful for the treatment of sewage; and consists in subjecting such natural phosphates of alumina or other natural phosphates, as before mentioned, to the action of sulphuric acid or of hydrochloric acid, or of mixtures of the same; and in the employment of the resulting products, either alone or in conjunction with a base, such as lime; or with carbonate of lime or magnesia, or carbonate of magnesia or dolomite, for the treatment of sewage, in order that certain constituents of the sewage may be thereby removed and be rendered available as fertilizing agents for agricultural purposes.

In carrying out this first part of our invention we first submit to the action of sulphuric acid, hydrochloric acid, or of mixtures of the same, the natural phosphates of alumina or other natural phosphates, as before mentioned, which phosphates are capable of being decomposed and rendered soluble by the employment of such acids. Having converted the phosphates into a soluble condition, or having obtained a solution of the phosphates, they may be either employed in their concentrated form, or a solution of the same may be diluted, and they are then in a fit and proper condition to be employed for the treatment of sewage.

While the sewage is contained in a cistern or reservoir, or while it is in the act of flowing thereinto, the requisite proportion of the soluble phosphates of alumina is to be added thereto; and after thorough admixture with the sewage by the use of agitators or other well-known means, the sewage so treated may be allowed to remain tranquil in the reservoir in order that subsidence of the resulting precipitate may be effected; or after having added to the sewage the requisite amount of soluble phosphates, a base, such, for example, as lime or carbonate of lime—but by preference in the form of milk-of-lime—is to be added in such quantity as that the phosphates in solution shall be precipitated.

This result will be known by the sewage acquiring a neutral or alkaline reaction; or the lime may be first added, and the solution of the phosphates added subsequently; but we prefer the former process; or the soluble phosphates may be first decomposed by means of lime or carbonate of lime, or otherwise, and the resulting precipitate may be employed for the purpose of effecting the separation of certain constituents of sewage.

In conjunction with any of the before-mentioned methods of carrying out our invention, deodorizing agents, such, for example, as animal or vegetable-charcoal, may be employed but good results will be obtained by the employment of the phosphates of alumina alone or in conjunction with lime, as before mentioned.

The sewage after treatment by either of the before-mentioned processes is allowed to settle, and the clear or supernatant water may be run off, and the deposit or precipitate collected and removed and employed, for agricultural purposes, either in the moist condition or after having been submitted to a drying desiccating process; or the precipitated phosphates may be again submitted to the action of sulphuric acid or hydrochloric acid, or of mixtures of the same, and the solution be again employed for the treatment of sewage in a manner similar to that before described.

The proportions in which the soluble phosphates may be employed will vary with the sewage to be operated upon and the quality of the manure desired to be obtained.

We have obtained good results by the employment of about two parts by weight of the soluble phosphates to every one thousand parts by weight of sewage treated; but we do not limit ourselves to such proportions.

The second part of our invention relates to the production of compounds capable of being employed as manures; and consists in the treatment and utilization of natural products, principally consisting of phosphates of alumina, such, for example, as those which occur in the West India islands, or elsewhere, and known as Redonda guano, or otherwise, so as to render them more suitable for agricultural purposes.

In carrying out this second part of our invention we submit such before-mentioned natural products to the action of sulphuric or of hydrochloric acid, or of mixtures of the same, so as to effect the solution of the soluble phosphates of alumina thereon contained, and after separating, if necessary, the insoluble portions from the solution, we then effect the precipitation of the phosphates held in solution, or which have been rendered soluble by means of a base, such, for example, as lime or magnesia, or by means of carbonate of lime or carbonate of magnesia, or mixtures of the same.

The precipitated phosphates thus obtained may be employed as manures for agricultural purposes in the same manner and for the same purposes for which the phosphates of lime are now used in agriculture or otherwise.

We would state we wish it to be understood that we do not claim the treatment of phosphates of alumina generally; but confine ourselves to the treatment of phosphates of alumina, such as or similar to those which are obtained from the sources mentioned.

Having now described and particularly ascertained the nature of the said invention, and the manner in which the same is or may be used or carried into effect, we would observe, in conclusion, that what we consider to be novel and original, and

Therefore claim as the invention, is—

1. The treatment of sewage or the production of manures by the use of the natural phosphates of alumina and of other natural phosphates, such as hereinbefore mentioned, or mixtures of the same, substantially in the manner herein described—that is to say, by first submitting such natural phosphates to the action of sulphuric acid, hydrochloric acid, or mixtures of the same, and employing such resulting products either alone or in conjunction with a base, such as lime, for the purposes set forth.

2. The treatment of those natural phosphates of alumina, such as herein referred to, for the production of compounds capable of being employed as fertilizing agents, in the manner hereinbefore described.

In testimony whereof we have signed our names to this specification in the presence of two subscribing witnesses.

DAVID FORBES.
ASTLEY PASTON PRICE.

Witnesses:
WM. D. WOOD,
F. ROWLAND.